United States Patent [19]

Yoshida

[11] Patent Number: 5,363,307
[45] Date of Patent: Nov. 8, 1994

[54] MEASURING APPARATUS HAVING AN INDICATOR FOR DISPLAYING TIDE OR TIDAL CURRENT DATA

[75] Inventor: Noriyuki Yoshida, Nishinomiya, Japan

[73] Assignee: Furuno Electric Company, Limited, Hyogo, Japan

[21] Appl. No.: 778,860
[22] PCT Filed: May 7, 1991
[86] PCT No.: PCT/JP91/00610
§ 371 Date: Mar. 4, 1992
§ 102(e) Date: Mar. 4, 1992
[87] PCT Pub. No.: WO91/17456
PCT Pub. Date: Nov. 14, 1991

[30] Foreign Application Priority Data

May 7, 1990 [JP] Japan ................................. 3-118131

[51] Int. Cl.⁵ ........................... G01S 7/62; G01P 5/00
[52] U.S. Cl. .................................. 364/452; 364/449; 367/113
[58] Field of Search ................. 364/452, 449; 340/995, 340/988, 984; 367/113, 131; 73/181, 170.29; 342/450, 451, 357

[56] References Cited

U.S. PATENT DOCUMENTS

| 3,745,313 | 7/1973 | Spilhaus | 235/88 |
| 4,428,057 | 1/1984 | Setliff et al. | 364/444 |
| 4,585,927 | 4/1986 | Thompson | 235/70 R |
| 4,590,569 | 5/1986 | Rogoff et al. | 364/452 |
| 4,729,121 | 3/1988 | Yoshioka et al. | 367/113 |
| 4,990,922 | 2/1991 | Young et al. | 342/52 |
| 5,040,414 | 8/1991 | Graebner | 73/151 |
| 5,115,417 | 5/1992 | Saunders | 368/19 |

OTHER PUBLICATIONS

GPS-Based Vessel Position Monitoring and Displaying System; Reynolds et al; IEEE AES Magazine; Jul. 1990; pp. 16–22.

Primary Examiner—Thomas G. Black
Assistant Examiner—Michael Zanelli

[57] ABSTRACT

A measuring apparatus such as a fish school detecting apparatus or a navigation apparatus which displays tide or tidal current data and is installed on a ship. The measuring apparatus comprises a transmitter/receiver for emitting ultrasonic search signals and receiving echo signals resulting from the search signals, a signal processor for processing output signals of the transmitter/receiver to produce signals representative of underwater conditions, a first memory for storing the signals outputted by the signal processor, a second memory having stored tide or tidal current data corresponding to ages of the moon in relation to points on the earth, a position signal inputting device for inputting latitude and longitude signals representative of a desired point on the earth, a time inputting device for inputting data representative of a day and an hour, a data searching device for searching relevant tide or tidal current data in the second memory based on inputted latitude and longitude and a day and hour data and reading the searched data, and an indicator for displaying tide or tidal current data searched by the data searching device or signals outputted by the first memory.

26 Claims, 4 Drawing Sheets

FIG. 2B

CALCULATION OF TIDE

| | YOKKAICHI |
|---|---|

| | PERIOD FOR CALCULATION | JANUARY 1, 1988 – DECEMBER 31, 1989 |
|---|---|---|

CONDITIONS FOR DISPLAY

| 1 | DISPLAY PERIOD | JANUARY 1, 1988 – FEBRUARY 2, 1989 |
|---|---|---|
| 2 | DAY OF THE WEEK | SATURDAY, SUNDAY, HOLIDAY |
| 3 | TIDE | SPRING TIDE |
| 4 | HIGH TIDE TIME | 4:00 – 5:59 |
| 5 | LOW TIDE TIME | 0:00 – 23:59 |

| DATE | 88/1/1 | 88/1/2 | 88/1/16 | 88/1/17 | 88/1/30 | 88/1/31 | 88/2/14 |
|---|---|---|---|---|---|---|---|
| WEEK DAYS | NEW YEAR'S DAY MID-WATER | SATURDAY MID-WATER | SATURDAY MID-WATER | SUNDAY MID-WATER | SATURDAY MID-WATER | SUNDAY MID-WATER | SUNDAY MID-WATER |
| TIDE TIME | 4:58 HIGH WATER | 5:43 HIGH WATER | 4:30 HIGH WATER | 5:26 HIGH WATER | 5:18 HIGH WATER | 5:47 HIGH WATER | 4:37 HIGH WATER |
| | 10:25 LOW WATER | 11:13 LOW WATER | 9:47 LOW WATER | 10:49 LOW WATER | 10:40 LOW WATER | 11:17 LOW WATER | 9:51 LOW WATER |
| | 15:48 HIGH WATER | 16:31 HIGH WATER | 14:57 HIGH WATER | 16:00 HIGH WATER | 15:40 HIGH WATER | 16:29 HIGH WATER | 14:48 HIGH WATER |
| | 22:37 LOW WATER | 23:19 LOW WATER | 22:06 LOW WATER | 23:02 LOW WATER | 22:28 LOW WATER | 23:12 LOW WATER | 21:59 LOW WATER |

FIG. 3

| + : SOUTHWARD CURRENT FLOW | | | | − : NORTHWARD CURRENT FLOW |
|---|---|---|---|---|
| TIME OF CHANGE OF CURRENT FLOW DIRECTION | | | | MAXIMUM |
| h | m | h | m | kn |
| 02 | 40 | 05 | 45 | − 5.4 |
| 08 | 46 | 11 | 29 | + 5.1 |
| 14 | 20 | 17 | 42 | − 5.7 |
| 20 | 48 | 23 | 53 | + 6.4 |

MEASURING APPARATUS HAVING AN INDICATOR FOR DISPLAYING TIDE OR TIDAL CURRENT DATA

TECHNICAL FIELD

The present invention relates to a measuring apparatus such as a navigation apparatus or a fish school detecting apparatus or the like which displays tide or tidal current data and is installed on a ship.

BACKGROUND ART

There is a close relationship between tides or tidal currents and an amount of fish catch in a fishery. Particularly, in angling, fish schools can be effectively detected and caught by paying attention to a tide or a tidal current to find a good fishery. Since an amount of fish catch depends on a tide or a tidal current in an angling area, it becomes very important in fishing to obtain tide or tidal current data in an expected area and at a day and hour beforehand and to take into account the tide or the tidal current at an area when fish schools are detected.

When a ship proceeds through a strait or the like, tides or tidal currents may become obstructions, or they may help a ship to advance efficiently. Thus, it is important to know beforehand tides or tidal currents along a route the ship proceeds or to know a tide or a tidal current at the present position of the ship.

Conventionally, such tide or tidal current data have been edited by, for example, the Maritime Safety Agency to produce tides or tidal currents table. Thus, it has been possible to know tide or tidal current conditions corresponding to ages of the moon at various points in Japan.

However, the tides and tidal currents table is voluminous, since there are described therein tides or tidal currents data corresponding to ages of the moon at many points throughout Japan. It has taken much energy and a long time to search the relevant tide or tidal current at a desired place and a desired day and hour out of the data in the table.

DISCLOSURE OF THE INVENTION

An object of the present invention is to provide a display apparatus for displaying tidal current data which has stored tidal current data in a memory, reads in a short time period, tidal current data corresponding to a desired place and a day and hour and displays the data read out.

Another object of the present invention is to provide a display apparatus for displaying tide or tidal current data which has stored tide or tidal current data in a memory, reads in a short time period tide or tidal current data corresponding to a desired place and a day and hour and displays the data read out.

Another object of the present invention is to provide an underwater detection apparatus which displays tidal current data corresponding to a desired place and a desired day and hour.

Another object of the present invention is to provide an underwater detection apparatus which is capable of predicting a good fishing area and a time range suitable for fishing.

Another object of the present invention is to provide a navigation apparatus which displays water current information at a desired place and a desired day and hour.

Another object of the present invention is to provide a navigation apparatus which is capable of advancing a ship efficiently.

Another object of the present invention is to provide an underwater detection apparatus which displays tide or tidal current data corresponding to a desired place and a desired day and hour.

Another object of the present invention is to provide a navigation apparatus which displays tide or tidal current information corresponding to a desired place and a desired day and hour.

Another object of the present invention is to provide a fish detection apparatus which is capable of displaying tide or tidal current information relating to the present position of own ship in addition to displaying underwater conditions.

Another object of the present invention is to provide a navigation apparatus which displays tide or water current flow information relating to the present position of own ship.

According to a first feature of the present invention, a tide or tidal current data indicating apparatus comprises a tide or tidal current data storing means having stored tide or tidal current data corresponding to ages of the moon at respective points on the earth surface, a latitude and longitude data generating means for generating longitude and latitude data representative of the position of a point on the earth, a time data generating means for generating data representative of a day and hour, data searching means for searching tide or tidal current data corresponding to a relevant age of the moon in the tide or tidal current data storing means based on the latitude and longitude data and the day and hour data and reading the searched data therefrom, and an indicator for displaying tide or tidal current data found by the data searching means.

According to a second feature of the present invention, an underwater detection apparatus comprises transmitting and receiving means for emitting ultrasonic search signals into the water and receiving echo signals resulting from the search signals, signal processing means for processing output signals of the transmitting and receiving means to produce signals representative of underwater conditions, first storing means for storing signals outputted by the signal processing means, second storing means for having stored tide or tidal current data corresponding to ages of the moon at respective points on the earth, a map data storing means having stored map data in a given area, position specifying means for specifying a particular point on a map, latitude and longitude calculating means for calculating latitude and longitude based on the point on the map specified by the position specifying means, time inputting means for inputting day and hour data, data searching means for searching relevant tide or tidal current data in the tide or tidal current data storing means based on the measured or inputted latitude and longitude and a day and hour data and reading the obtained data therefrom, and an indicator for displaying the tide or tidal current data found by the data searching means or the signals outputted by the first storing means.

According to a third feature of the present invention, an underwater detection apparatus comprises transmitting and receiving means for radiating ultrasonic search signals into the water and receiving echo signals resulting the search signals, signal processing means for processing the signals outputted from the transmitting and receiving means to produce signals representative of underwater conditions, first storing means for storing the signals outputted from the signal processing means, second storing means having stored tide or tidal current data corresponding to ages of the moon at points on the earth, own ship's position measuring means for measuring the position of own ship, time measuring means for measuring a day and hour at which the position of own ship is measured, data searching means for searching relevant tide or tidal current data in the second storing means based on the measured own ship's position and day and hour and reading the found data therefrom, and an indicator for displaying the tide or tidal current data searched by the data searching means or the signals outputted by the first storing means.

According to a fourth feature of the present invention, a navigation apparatus comprises indicating means for displaying the position of own ship, tide or tidal current data storing means having stored tide or tidal current data corresponding to ages of the moon at points of the earth, map data storing means having stored map data in a given area, position specifying means for specifying a specific point on a map based on the map data, latitude and longitude calculating means for calculating latitude and longitude based on the point on the map specified by the position specifying means, time measuring means for measuring a day and hour at which the latitude and longitude are calculated, data searching means for searching relevant tide or tidal current data in the tide or tidal current data storing means based on the measured latitude and longitude and the day and hour and reading the searched data therefrom, and an indicator for displaying the tide or tidal current data searched by the data searching means.

According to a fifth feature of the present invention, a navigation apparatus comprises tide or tidal current data storing means having stored tide or tidal current data corresponding to ages of the moon at points on the earth, own ship's position measuring means for measuring the position of own ship, time measuring means for measuring a day and hour at which the position of own ship is measured, data searching means for searching relevant tide or tidal current data in the storing means based on the measured own ship's position and day and hour and reading the searched data therefrom, and an indicator for displaying the tide or tidal current data searched by the data searching means.

According to a sixth feature of the present invention, a display apparatus for displaying tidal current data comprises tidal current data storing means having stored tidal current data and a point on the earth and a day and hour at which the tidal current data is measured, earth point data generating means for generating data relating to a point on the earth, time data generating means for generating data relating days and hours, data searching means for searching relevant tidal current data in the tidal current data storing means based on the earth point data and the day and hour data and reading the resultant data therefrom, and an indicator for displaying the tidal current data searched by the data searching means.

According to a seventh feature of the present invention, a display apparatus for displaying tidal current data comprises tidal current data storing means having stored tidal current data corresponding to ages of the moon at respective points on the earth, own ship's position measuring means for producing data representative of the position of own ship, time data generating means for generating data relating to a day and hour, data searching means for searching tidal current data corresponding to a relevant age of the moon stored in the tidal current data storing means based on the own ship's position data and the day and hour data and reading the searched data, and an indicator for displaying tidal current data searched by the data searching means.

According to an eighth feature of the present invention, an underwater detection apparatus comprises tide and tidal current data storing means having stored tide or tidal current data corresponding to ages of the moon at respective points on the earth, latitude and longitude data generating means for generating longitude and latitude data representative of the position of a point on the earth, time data generating means for generating time data representative of a day and hour, data searching means for searching tide or tidal current data corresponding to a relevant age in the tide and tidal current data storing means based on the latitude and longitude data and the day and hour data and reading the searched data therefrom, and an indicator for displaying the tide and tidal current data searched by the data searching means.

According to a ninth feature of the present invention, an underwater detection apparatus comprises transmitting and receiving means for emitting ultrasonic search signals into the water and receiving echo signals resulting from the search signals, signal processing means for processing output signals of the transmitting and receiving means to produce signals representative of underwater conditions, first storing means for storing signals outputted by the signal processing means, second storing means having stored tidal current data corresponding to ages of the moon at respective points on the earth, own ship's measuring means for measuring the position of own ship, time measuring means for measuring a day and hour at which the position of own ship is measured, data searching means for searching relevant tidal current data in the second storing means based on the measured own ship's position and day and hour and reading the searched data therefrom, and an indicator for displaying the tidal current data searched by the data searching means or the signals outputted by the first storing means.

According to a tenth feature of the present invention, a navigation apparatus comprises indicating means for displaying the position of own ship, tide or tidal current data storing means having stored tide or tidal current data corresponding to ages of the moon at respective points on the earth, latitude and longitude data generating means for generating longitude and latitude data representative of a point on the earth, days and hours data generating means for generating data representing days and hours, data searching means for searching tide or tidal current data corresponding to a relevant age of the moon in the tide or tidal current data storing means based on the latitude and longitude data and the day and hour data and reading the searched data therefrom, and an indicator for displaying the tide or tidal current data searched by the data searching means.

According to an eleventh feature of the present invention, a navigation apparatus comprises tidal current data storing means having stored tidal current data corresponding to ages of the moon at respective points on the earth, own ship's position measuring means for measuring the position of own ship, day and hour measuring means for measuring a day and hour at which the position of own ship is measured, data searching means for searching relevant tidal current data in the storing means based on the measured position of own ship and day and hour and reading the searched data therefrom, and an indicator for displaying the tidal current data searched by the data searching means.

According to a twelfth feature of the present invention, a display apparatus for displaying tidal current data comprises means for measuring a tidal current, means for measuring a point on the earth at which the tidal current is measured, means for measuring a day and hour at which the tidal current is measured, a memory having stored the tidal current data, the point on the earth and the day and hour, earth point data input means for inputting data relating to a point on the earth, day and hour input means for inputting data relating to a day and hour, data searching means for searching relevant tidal current data in the storing means based on the earth point data and the day and hour data and reading the searched data therefrom, and an indicator for displaying the tidal current data searched by the data searching means.

According to a thirteenth feature of the present invention, a display apparatus for displaying tidal current data comprises means for measuring tidal current, means for measuring a point on the earth at which the tidal current is measured, means for measuring the day and hour at which the tidal current is measured, a memory having stored the tidal current data, the point on the earth and the day and hour, own ship's position measuring means for measuring the position of own ship to produce data representative of the position of own ship, time data generating means for measuring a day and hour to produce day and hour data, data searching means for searching tidal current data in the memory based on the own ship's position data and the day and hour data and reading the searched data therefrom, and an indicator for displaying the tidal current data searched by said data searching means.

According to a fourteenth feature of the present invention, an underwater detection apparatus comprises transmitting and receiving means for emitting ultrasonic search signals into the water and receiving echo signals resulting from the searched signals, signal processing means for processing output signals of the transmitting and receiving means to produce signals representative of underwater conditions, first storing means for storing the signals outputted by the signal processing means, own ship's position measuring means for measuring the position of own ship on the earth, means for measuring a tidal current at the measured position of own ship, means for measuring a day and hour at which the tidal current is measured, second storing means having stored the tidal current data, the own ship's position, and the day and hour data, input means for generating longitude and latitude data representative of a point on the earth, time data input means for inputting day and hour data representative of a day and hour, data searching means for searching relevant tidal current data in the storing means based on the obtained own ship's position and the inputted day and hour data and reading the searched data therefrom, and an indicator for displaying the tidal current data searched by the data searching means or the signals outputted from the first storing means.

According to a fifteenth feature of the present invention, an underwater detection apparatus comprises transmitting and receiving means for emitting ultrasonic search signals into the water and receiving echo signals resulting from the searched signals, signal processing means for processing output signals of the transmitting and receiving means to produce signals representative of underwater conditions, first storing means for storing the signals outputted by the signal processing means, own ship's position measuring means for measuring the position of own ship on the earth, means for measuring a tidal current at the measured position of own ship, means for measuring a day and hour at which the tidal current is measured, second storing means having stored the tidal current data, the own ship's position, and the day and hour data, position signal generating means for generating longitude and latitude data representative of the position of a point on the earth, time data input means for inputting day and hour data representative of a day and hour, data searching means for searching relevant tidal current data in the storing means based on the obtained own ship's position and the inputted day and hour data and reading the searched data therefrom and an indicator for displaying the tidal current data searched by the data searching means or the signals outputted from the first storing means.

According to a sixteenth feature of the present invention, an underwater detection apparatus comprises transmitting and receiving means for radiating ultrasonic search signals into the water and receiving echo signals resulting from the search signals, signal processing means for processing output signals of the transmitting and receiving means to produce signals representative of underwater conditions, first storing means for storing the signals outputted by the signal processing means, own ship's position measuring means for measuring the position of own ship on the earth, means for measuring a tidal current at the measured position of own ship, means for measuring a day and hour at which the tidal current is measured, second storing means having stored the tidal current data, the own ship's position, and the day and hour data, own ship's position measuring means for measuring the position of own ship, day and hour measuring means for measuring a day and hour at which the own ship's position is measured, data searching means for searching relevant tidal current data in the storing means based on the obtained own ship's position and the inputted day and hour data and reading the searched data therefrom, and an indicator for displaying the tidal current data searched by the data searching means or the signals outputted from the first storing means.

According to a seventeenth feature of the present invention, a navigation apparatus comprises means for indicating the position of own ship, own ship's position measuring means for measuring the position of own ship on the earth, means for measuring a tidal current at the measured position of own ship, means for measuring a day and hour at which the tidal current is measured, a memory having stored the tidal current data, the own ship's position and the day and hour data, input means for inputting longitude and latitude data representative of the position of a point on the earth, time data input means for inputting data representing a day and hour, data searching means for searching relevant tidal current data in the storing means based on the obtained own ship's position and the inputted day and hour data and reading the resultant data therefrom, and an indicator for displaying tidal current data searched by the tidal current means.

According to an eighteenth feature of the present invention, a navigation apparatus comprises own ship's position measuring means for measuring the position of own ship on the earth, means for measuring a tidal current at the measured position of own ship, means for measuring a day and hour at which the tidal current is measured, a memory having stored the tidal current data, the own ship's position and the day and hour data, position signal generating means for generating longitude and latitude data representative of the position of a point on the earth, time data input means for inputting data representing a day and hour, data searching means for searching relevant tidal current data in the storing means based on the obtained own ship's position and the inputted day and hour data and reading the resultant data therefrom, and an indicator for displaying tidal current data searched by the data searching means.

BRIEF DESCRIPTION OF DRAWINGS

FIGS. 2A and 2B are a display example showing tide data.

FIG. 3 is a display example showing tidal current data.

EMBODIMENTS

Figure 1:
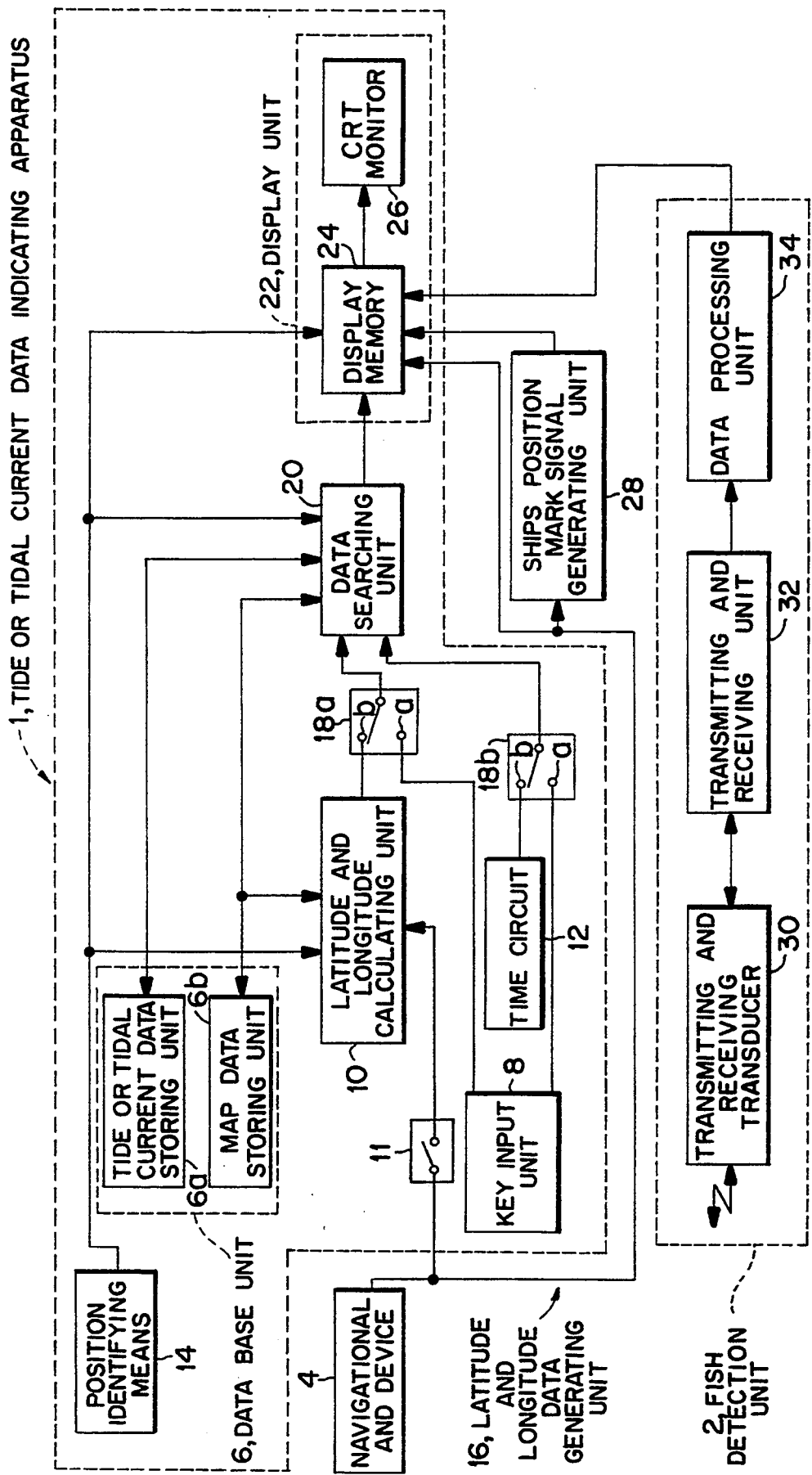
FIG. 1 shows a block diagram of an embodiment according to the present invention.

Referring to FIG. 1, numeral "1" represents the whole construction of a tide and tidal current data display apparatus. Numeral "2" represents a fish detection unit; and numeral "4" represents a navigational aid device comprising a GPS receiver or a loran receiver or the like.

Numeral "6" represents a data base unit which comprises a tide or tidal current data storing unit 6a for storing data relating to a tide or a tidal current corresponding to ages of the moon at points on the earth and a map data storing unit 6b for storing map data such as shorelines in given areas. Numeral "8" represents a key input unit for manually inputting data such as latitude and longitude representing the position of a given point, a desired day, a time instant, and the like. Numeral "10" represents a latitude and longitude calculating unit for calculating the latitude and longitude of a point on a map specified based on measured data obtained by the navigational aid device 4 or based on position data of a point on a map identified by a position identifying means 14 which will be explained hereinafter. The navigational aid device 4 comprises a GPS receiver (Global Positioning System receiver), measures the position of own ship, and produces signals representative of the positon of own ship. The navigational aid device 4 can be comprised of a loran receiver, a Decca receiver, an Omega receiver or the like. Numeral "11" represents a switching device for passing or interrupting data representative of the position of own ship produced by the navigational aid device 4. Numeral "12" represents a timer circuit for producing data representative of days or time instants. Numeral "14" represents a position identifying means comprised of a track-ball which identifies a desired point with a cursor on a map displayed on a CRT monitor 26 based on map data stored in the map data storing unit 6b. The position identifying means 14 may be comprised of key switches or a mouse. A latitude and longitude data producing means 16 produces data representative of the latitude and longitude of a desired point or of the position of own ship. When latitude and longitude the data producing means 16 is comprised of the key input unit 8, it generates data representative of the latitude and longitude of a desired position. When the data producing means 16 is comprised of the position identifying means 14 and the latitude and longitude calculating unit 10, it generates data representative of the longitude and latitude of a desired point specified on a map displayed on an indicator 26. When the data producing means 16 is comprised of the navigational aid device 4 and the latitude and longitude calculating means 10, it produces data representative of the latitude and longitude of own ship's position.

"18a" represents a first switching unit for switching the output terminal of the latitude and longitude calculating unit 10 and the output terminal of the key input unit 8. "18b" represents a second switching unit for switching the output terminal of the timer circuit 12 and the output terminal of the key input unit 8. Numeral "20" represents a data searching unit for searching tide or tidal current data or tide and tidal current data corresponding to a relevant area and corresponding to a relevant age of the moon stored in the tide and/or tidal current data storing unit 6a based on the latitude and longitude data from the first switching unit 18a and on the day and hour data from the second switching unit 18b, and reading the searched data therefrom. Numeral "28" represents a ship's position mark signal generating unit for generating mark display signals representative of ship's own position based on measured data representative of ship's own position obtained by the navigational aid device 4. Numeral 22 represents a display unit comprising a display memory 24 and a CRT indicator 26. The display memory 24 comprises a CPU and stores data representative of own ship's position, tide or tidal current data or tide and tidal current data, mad data, signals representative of ship's position markers, data representative of own ship's position, or data representative of fish schools respectively supplied from the navigational aid device 4, the data base unit 6, the data searching unit 20, the ship's position mark signal generating unit 28 and the data processing unit 34 in the same memory area superimposedly or in respective different memory areas obtained by dividing the memory.

The fish school detecting unit 2 comprises a transmitting-and-receiving transducer 30 for radiating and receiving ultrasonic signals, a transmitting-and-receiving unit 32 for controlling the transmitting-and-receiving transducer 30 to emit ultrasonic signals therefrom and for amplifying and demodulating reception signals resulting from ultrasonic echo signals and a data processing unit 34 for outputting image display data based on the reception signals obtained by the transmitting-and-receiving unit 32. The construction of the fish school detecting unit 2 is well known.

The operation of the embodiment according to the present invention will be explained hereinafter.

Figure 2A:
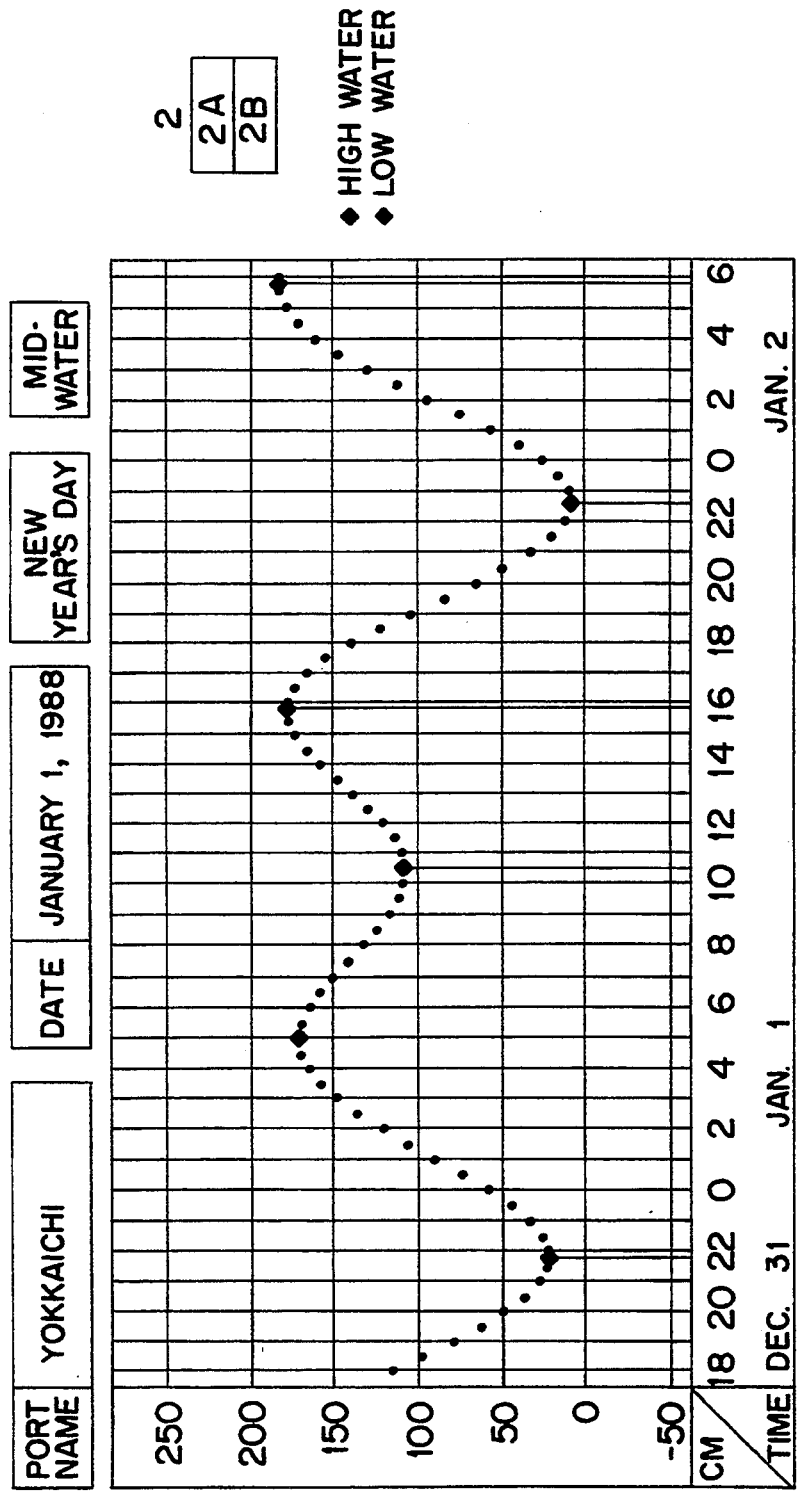

When a desired place, day and hour are inputted manually, the first switching unit 18a and the second switching unit 18b are firstly switched to manual setting sides (to the side of a "a" contact terminal in the figure), and then there are supplied latitude and longitude data representing a desired place and data representing a desired day and hour from the key input unit 8. The latitude and longitude data are supplied to the data searching unit 20 through the first switching unit 18a; and the data representative of a day and hour are supplied to the unit 20 through the second switching unit 18b. The data searching unit 20 searches in the tide and tidal current data storing unit 6a based on the latitude and longitude data and on the day and hour data to find tide data or tidal current data or tide and tidal current data corresponding to the place represented by the latitude and longitude and to the day and hour and reads the tide or tidal current data therefrom and transfers the data to the display memory 24 to write the data thereinto. The tide or tidal current data stored in the display memory 24 are read out therefrom in synchronism with TV scanning of electron beams and are displayed on a CRT indicator 26. Consequently, there will be displayed a desired point, a day and hour, and tide or tidal current data or a combination of tide and tidal current data for a time period having the day and hour with its center on the CRT indicator 26, as shown in FIG. 2 or in FIG. 3. The tide or tidal current data are displayed, for example, in a manner that the tide data are displayed on the whole screen of the indicator 26, or the tidal current data are displayed on the whole screen of the indicator 26. The tide data and tidal current data may be displayed respectively on upper and lower portions of the screen obtained by dividing the screen into two.

The indicator 26 displays the signals supplied from the display memory 24 so that underwater conditions below the own ship are indicated thereon. In this case, echo signals caught by the transmitting and receiving transducer 30 are supplied through the transmitting and receiving unit 32 and the data processing unit 34 to the display memory 24 to be stored therein. When underwater conditions are displayed on the indicator 26, display mode selections are made so that underwater conditions are indicated on the whole screen thereof, or tide data or tidal current data or a combination of tide and tidal current data are displayed thereon. Tide or tidal current data and underwater conditions may be displayed respectively on one and the other corresponding portions of the screen of the indicator 26 obtained by horizontally dividing the screen into two parts.

The apparatus shown in FIG. 1 can be used as a navigational aid apparatus by removing the fish detecting unit therefrom. In this case, there are displayed on the indicator 26 the signals representative of the position of own ship, for example, latitude and longitude signals supplied thereto from the navigational aid device 4 through the display memory 24. Display mode selections are made so that data representing the position of own ship are displayed on the whole screen of the indicator, or tide data or tidal current data or a combination of tide and tidal current data are displayed thereon. The tide data or tidal current data and the data representing the position of own ship are displayed respectively on two respective portions of the screen of the indicator 26 obtained by horizontally dividing the screen thereof into two parts.

When tide or tidal current conditions are desired to be recognized by specifying a point on the map, the switch 11 has been maintained off and data for specifying an area are inputted by the key input unit 8 and are supplied to the data searching unit 20 through the first switching unit 18a after the first switching unit 18a is switched to the key input side. The data searching unit 20 reads in response to the area specifying data map data of a desired area out of the map data storing unit 6b to the display memory 24. The map data are further supplied to the indicator 26. As a result, a map of a specified area including shorelines is displayed on the screen of the indicator 26. The ship's position mark signal generating unit 28 produces mark display signals representative of the position of own ship based on measured data obtained by the navigational aid device 4. The mark display signals are supplied to the CRT indicator 26 through the display memory 24. Thus, the position of own ship is displayed as a mark in a map on the screen of the CRT indicator 26.

Next, after the first switching unit 18a is turned to the automatic setting side (to "b" contact point in the figure), a cursor indicated on the CRT indicator 26 is moved by means of the position identifying means 14 to indicate a specified point on the map. The latitude and longitude calculating unit 10 calculates based on data stored in the map data storing unit 6b and specified by the position identifying means 14 to produce the latitude and longitude of a position specified. The resultant latitude and longitude data are supplied to the data searching unit 20 through the first switching unit 18a. While, when a day and hour at a point are specified by means of the key input unit 8, data relating to the day and hour are supplied to the data searching unit 20 through the second switching unit 18b. In the same way as in the foregoing, tide or tidal current data relating to the specified position and day and hour data will be displayed on the CRT indicator 26. In other words, after acknowledging a point on the map, a tide or a tidal current or both a tide and a tidal current at the point are recognized.

Even when a desired point is specified on a map, a tide or a tidal current is displayed in the same way as in the foregoing in which a desired point and a day and hour are inputted manually.

The indicator 26 indicates signals supplied from the display memory 24 so that underwater conditions below the own ship are displayed on the screen thereof. In this case, echo signals caught by the transmitting and receiving transducer 30 are supplied through the transmitting and receiving unit 32 and the data processing unit 34 to the display memory 24 to be stored therein. When underwater conditions are desired to be displayed on the indicator 26, a display mode selection is required to be made so that underwater conditions are displayed on the whole screen of the indicator, or tide data or tidal current data or both tide and tidal current data are displayed. Tide or tidal current data and underwater conditions are displayed respectively on two respective portions of the screen of the indicator 26 obtained by dividing horizontally the screen into the two parts.

When the latitude and longitude of the present position of own ship are desired to be automatically derived, the switch 11 is turned on and the first switching unit 18a is switched to the automatic setting side. Measured data relating to the position of the ship are supplied to the latitude and longitude calculating unit 10 from the navigational aid device 4. The latitude and longitude calculating unit 10 calculates based on the measured data latitude and longitude data which are supplied to the data searching unit 20 through the first switching unit 18a. Thus, when tide or tidal current conditions at a ship's position are desired to be recognized, it becomes unnecessary to input latitude and longitude data manually.

Further, when a present day and hour are desired to be specified automatically, the second switching unit 18a is turned to the automatic setting side (to "b" contact point in the figure) so that day and hour data obtained by the timer circuit 12 are supplied to the data searching unit 20. Thus, tide or tidal current conditions at the present day and hour are desired to be recognized, it becomes unnecessary to input a day and hour manually.

In this way, when the latitude and longitude of the present position of own ship and the present day and hour are automatically inputted, there will be displayed tide data or tidal current data or both tide and tidal current data in relation to the present position of own ship.

It should be noted that even when the latitude and longitude of the present position of own ship and the present day and hour are automatically inputted, tide and tidal current are displayed in the same way as the ones displayed by an underwater detection system or by a navigational aid apparatus with a desired place and a day and an hour being manually inputted as in the foregoing.

In other words, the indicator 26 displays signals supplied from the display memory 24 so that underwater conditions below the own ship are displayed on the screen. In this case, echo signals caught by the transmitting and receiving transducer 30 are supplied through the transmitting and receiving unit 32 and the data processing unit 34 to the display memory 24 to be stored therein. When underwater conditions are desired to be displayed on the indicator 26, display selections are made so that underwater conditions are indicated on the whole screen thereof, or tide data or tidal current data or both tide and tidal current data are displayed thereon. There may be respectively displayed tide data or tidal current data and underwater conditions on two respective portions of the screen of the indicator obtained by horizontally dividing the screen into two parts.

Even when latitude and longitude of the present position of own ship and the present day and hour are automatically inputted, the apparatus shown in FIG. 1 can be used as a navigation apparatus by removing the fish school detecting unit from the block diagram shown in FIG. 1 in the same way as in the foregoing in which a desired place, a day and an hour are manually specified. In this case, there are displayed on the indicator 26 signals representative of the position of own ship, for example, latitude and longitude signals which are supplied from the navigational aid device 4 through the display memory 24 to the indicator. Display mode selections are made so that data representative of the position of own ship are displayed on the whole screen of the indicator, or tide data or tidal current data or both tide and tidal current data are displayed thereon. Further, tide or tidal current data and data representative of the position of own ship are displayed respectively on two respective parts of the screen of the indicator 26 obtained by horizontally dividing the screen into two.

It should be noted that although latitude and longitude signals are used as signals representing a point on the earth in the foregoing embodiments according to the present invention, there can be utilized other signals such as time difference signals which are used in a loran transmission and reception system to bring about the same effects.

It should be noted that there may be stored in the tide and tidal current data storing unit 6a used in the foregoing embodiments, for example, relevant data of the tide and tidal current data included in the tide and tidal current table edited and published by the Maritime Safety Agency. Further, there may be installed on an own ship a navigational aid device such as a GPS receiver or a loran receiver or the like for measuring the position of own ship, an apparatus for measuring water current flows at respective positions of the own ship and a time measuring device for measuring a day and an hour at which a water current flow is measured in order to measure and collect tidal current data in a desired area and to store the resultant data in the tide and tidal current data storing unit 6a. As an apparatus for measuring tidal currents at respective points of the own ship, there can be used an apparatus for radiating ultrasonic signals and measuring a tidal current by utilizing Doppler effects. Doppler tidal current measuring apparatuses are known in this art.

EFFECTS PRODUCED BY THE INVENTION

According to the present invention, there can be displayed tide or tidal current data, which are necessary when a ship proceeds or when a fish school is caught, at a desired place and at a time instant in a day in a short time period and in a simple manner so that tide and tidal current conditions can be recognized easily and in a short time period.

Thus, it becomes possible for a ship to smoothly proceed through a strait or the like without being affected by a tide or a tidal current by, for example, having on the ship a navigation apparatus displaying tide or tidal current data. It becomes possible to set the most favorable fishing area or day and hour in advance by having a fish school detecting apparatus displaying tide or tidal current data.

Further, when the present position of own ship is measured by a GPS receiver or a loran receiver, it becomes possible to detect a fish school or to catch a fish school after clearly knowing a tide or a tidal current at the present position of own ship and to efficiently navigate a ship in a strait or the like.

I claim:
1. A display apparatus for displaying tide or tidal current data comprising:
   tide or tidal current data storing means for storing the tide or tidal current data corresponding to ages of the moon at a plurality of points on the earth;
   latitude and longitude data generating means for generating longitude and latitude data representative of one of the plurality of points on the earth;
   time data generating means for generating day and hour data;
   data searching means for reading the tide or tidal current data for a desired age of the moon stored in said tide or tidal current data storing means based on the latitude and longitude data and the day and hour data; and
   display means for displaying the tide or tidal current data for the desired age of the moon read by said data searching means,
   said latitude and longitude data generating means including,
      map data storing means for storing map data an area,
      position specifying means for specifying a point of the stored map data, and
      latitude and longitude calculating means for calculating a latitude and longitude based,,on the point of the stored map data specified by said position specifying means.
2. The display apparatus of claim 1, said latitude and longitude data generating means including a navigational aid device and latitude and longitude calculating means for calculating a latitude and longitude based on data obtained from said navigational aid device.

3. The display apparatus of claims 1 or 2, said time data generating means including a timer circuit.

4. The display apparatus of claim 2, wherein said navigational aid device is one of a GPS receiver and a loran receiver.

5. An underwater detection apparatus comprising:
transmitting and receiving means for emitting ultrasonic search signals and receiving echo signals resulting from the search signals;
signal processing means for processing output signals of said transmitting and receiving means to produce signals representative of underwater conditions;
first storing means for storing the signals representative of underwater conditions;
second storing means for storing tide or tidal current data corresponding to ages of the moon and points on the earth;
map data storing means for storing map data of an area;
position specifying means for specifying a point of the stored map data;
latitude and longitude calculating means for calculating a latitude and longitude based on the point of the stored map data specified by said position specifying means;
time input means for inputting day and hour data;
data searching means for reading tide or tidal current data stored in said tide and tidal current data storing means based on the latitude and longitude data and the day and hour data; and
an indicator for displaying the tide or tidal current data read by said data searching means or the signal representative of underwater conditions stored in said first storing means.

6. The display apparatus of claim 5, wherein said latitude and longitude calculating means calculates the latitude and longitude from measured latitude and longitude data.

7. The display apparatus of claim 5, wherein said latitude and longitude calculating means calculates the latitude and longitude from input latitude and longitude data.

8. An underwater detection apparatus comprising:
transmitting and receiving means for emitting ultrasonic search signals and receiving echo signals resulting from the search signals;
signal processing means for processing output signals of said transmitting and receiving means to produce signals representative of underwater conditions;
first storing means for storing the signals representative of underwater conditions;
second storing means for storing tide or tidal current data corresponding to ages of the moon and to points on the earth;
ship position measuring means for measuring a position of a ship;
time measuring means for measuring a day and an hour at which the position of the ship is measured;
data searching means for reading tide or tidal current data stored in said second storing means based on the measured position of the ship and the day and hour; and
an indicator for displaying the tide or tidal current read by said data searching means or the signals representative of underwater conditions stored in said first storing means.

9. The underwater detection apparatus of claim 8 said ship position measuring means including one of a GPS receiver, a loran receiver, a Decca receiver, and an Omega receiver.

10. A navigation apparatus comprising:
display means for displaying a position of a ship;
tide or tidal current data storing means for storing tide or tidal current data corresponding to ages of the moon and to points on the earth;
map data storing means for storing map data of an area;
position specifying means for specifying a point of the stored map data;
latitude and longitude calculating means for calculating a latitude and longitude based on the point of the stored map data specified by said position specifying means;
time measuring means for measuring a day and hour at which the latitude and longitude are calculated;
data searching means for reading tide or tidal current data stored in said tide and tidal current data storing means based on the calculated latitude and longitude and the day and hour; and
an indicator for displaying the tide or tidal current data read by said data searching means.

11. A navigation apparatus comprising:
tide or tidal current data storing means for storing tide or tidal current data corresponding to ages of the moon and to points on the earth;
ship position measuring means for measuring a position of a ship;
time measuring means for measuring a day and hour at which the position of the ship is measured;
data searching means for reading tide or tidal current data stored in said storing means based on the measured position of the ship and the day and hour; and
an indicator for displaying the tide or tidal current data read by said data searching means.

12. A display apparatus for displaying tidal current data comprising:
tidal current data storing means for storing tidal current data corresponding to ages of the moon and to points on the earth;
ship position measuring means for measuring a position of a ship to produce ship position data;
time data generating means for generating day and hour data;
data searching means for reading tidal current data corresponding to a relevant age of the moon stored in said tidal current data storing means based on the ship position data and the day and hour data; and
an indicator for displaying the tidal current data read by said data searching means.

13. The display apparatus of claim 12 wherein the ship position measuring means generates longitude and latitude data.

14. In an underwater detection apparatus for transmitting ultrasonic search signals in a direction and receiving echo signals and for displaying the echo signals, a display apparatus, including:
tide or tidal current data storing means for storing hide or tidal current data corresponding to ages of the moon in relation to points on the earth;
latitude and longitude data generating means for automatically generating longitude and latitude data, representative of a position of a point on the earth;
time data generating means for generating time data representative of a day and hour;

data searching means for reading tide or tidal current data corresponding to a relevant age of the moon from said tide and tidal current data storing means based on the latitude and longitude data and the day and hour data; and an indicator for automatically displaying the tide and tidal current data read by said data searching means.

15. An underwater detection apparatus comprising:

transmitting and receiving means for emitting ultrasonic search signals and receiving echo signals resulting from the search signals;

signal processing means for processing output signals of said transmitting sand receiving means to produce signals representative of underwater conditions;

first storing means for storing the signals representative of underwater conditions;

second storing means for storing tidal current data corresponding to ages of the moon in relation to points on the earth;

ship measuring means for measuring a position of a ship;

time measuring means for measuring a day and hour at which the position of the ship is measured;

data searching means for reading tidal current data in said second storing means based on the measured ship position and the measured day and hour;

an indicator for displaying the tidal current data read by the data searching means or the signals representative of underwater conditions stored in said first storing means.

16. A navigation apparatus comprising:

indicating means for displaying a position of a ship;

tide and tidal current data storing means for storing tide or tidal current data corresponding to ages of the moon at points on the earth;

latitude and longitude data generating means for generating longitude and latitude data representative of a point on the earth;

day and hour data generating means for generating day and hour data;

data searching means for reading tide or tidal current data corresponding to a relevant age of the moon from in said tide or tidal current data storing means based on the latitude and longitude data and the day and hour data; and an indicator for displaying the tide or tidal current data read by said data searching means.

17. A navigation apparatus comprising:

tidal current data storing means for storing tidal current data corresponding to ages of the moon at points on the earth;

ship position measuring means for measuring a position of a ship;

day and hour measuring means for measuring a day and an hour at which the position of the ship is measured;

data searching means for reading tidal current data in said tidal current storing means based on the measured position of the ship and the day and hour; and an indicator for displaying the tidal current data read by the data searching means.

18. A display apparatus for displaying water current flow data comprising:

means for measuring water current flow data;

means for measuring a point on the earth at which the water current flow data is measured;

memory means for storing the water current flow data and a day and hour at which the water current flow data is measured;

earth point data input means for inputting earth point data;

time input means for inputting current day and hour data;

data searching means for reading water current flow data from said memory means based on the earth point data and the current day and hour data; and an indicator for displaying the water current flow data read by said data searching means.

19. The display apparatus of claim 18 said means for measuring a point on the earth including one of a GPS receiver, a loran receiver, a Decca receiver, and an Omega receiver.

20. A display apparatus for displaying water current flow data comprising:

means for measuring water current flow data;

means for measuring a point on the earth at which the water current flow data is measured;

memory means for storing the water current flow data, the points on the earth, and days and hours at which the points on the earth are measured;

ship position measuring means for measuring a position of a ship to produce ship position data;

time data generating means for measuring current day and hour data;

data searching means for reading the water current flow data from said memory means based on the ship position data and the current day and hour data; and an indicator for displaying the water current flow data read by said data searching means.

21. An underwater detection apparatus comprising:

transmitting and receiving means for emitting ultrasonic search signals, and receiving echo signals resulting from the searched signals;

signal processing means for processing output signals of said transmitting and receiving means to produce signals representative of underwater conditions;

first storing means for storing the signals representative of underwater conditions;

ship position measuring means for measuring a position of a ship on the earth;

means for measuring a day and hour at which a tidal current is measured;

second storing means for storing tidal current data, the ship position data and the day and hour data;

input means for generating longitude and latitude data for a point on the earth;

time data input means for inputting day and hour data;

data searching means for reading tidal current data from said second storing means based on the ship position data and the input day and hour data; and a indicator for displaying the tidal current data read by said data searching means or the signals representative of underwater conditions stored by said first storing means.

22. An underwater detection apparatus comprising:

transmitting and receiving means for radiating ultrasonic search signals, and receiving echo signals resulting from the search signals;

signal processing means for processing output signals of said transmitting and receiving means to produce signals representative of underwater conditions;

first storing means for storing the signals representative of underwater conditions;

ship position measuring means for measuring a position of a ship on the earth;

means for measuring day and hour data at which a tidal current is measured;

second storing means for storing the tidal current data, the ship position data, and the day and hour data;

position signal generating means for generating longitude and latitude data representative of a point on the earth;

time data inputting means for inputting day and hour data;

data searching means for reading tidal current data from said storing means based on the ship position data and the input day and hour data; and an indicator for displaying the tidal current data obtained by said data searching means or the signals representative of underwater conditions stored by said first storing means.

23. An underwater detection apparatus comprising:

transmitting and receiving means for emitting ultrasonic search signals and receiving echo signals resulting from the search signals;

signal processing means for processing output signals of said transmitting and receiving means to produce signals representative of underwater conditions;

first storing means for storing the signals representative of underwater conditions;

ship position measuring means for measuring a position of a ship on the earth;

means for measuring a tidal current at the measured position of the ship;

means for measuring a day and hour at which a tidal current is measured;

second storing means for storing the tidal current data, the ship position data, and the day and hour data;

data searching means for reading tidal current data stored said second storing means based on the measured position of the ship and the measured day and hour data; and an indicator for displaying the tidal current data read by said data searching means or the signals representative of underwater conditions stored by said first storing means.

24. A navigation apparatus comprising:

means for indicating a position of a ship;

ship position measuring means for measuring the position of the ship on the earth;

means for measuring a tidal current at the measured position of the ship;

means for measuring a day and hour at which the tidal current is measured;

memory means for storing the tidal current data, the ship position data, and the day and hour data;

input means for generating longitude and latitude data representative of a point on the earth;

time data input means for inputting data representing a day and hour;

data searching means for reading tidal current data from said storing means based on the ship position data and the input day and hour data; and an indicator for displaying the tidal current data read by said tidal current means.

25. A navigation apparatus comprising:

ship position measuring means for measuring a position of a ship on the earth;

means for measuring tidal current data at the measured position of the ship;

means for measuring a day and hour at which the tidal current is measured;

memory means for storing the tidal current data, the ship position data, and the day and hour data;

position signal generating means for generating longitude and latitude data representative of a point on the earth;

time data input means for inputting data representing a day and hour;

data searching means for reading tidal current data from said storing means based on the ship position data and the input day and hour data; and an indicator for displaying the tidal current data read by said tidal current means.

26. The navigation apparatus of claim 25, said ship position measuring means including one of a GPS receiver, a loran receiver, a Decca receiver, and an Omega receiver.

* * * * *